United States Patent
Lee et al.

(10) Patent No.: US 12,420,691 B2
(45) Date of Patent: Sep. 23, 2025

(54) ELECTRIC-POWERED MECHANICAL CUP HOLDER

(71) Applicant: ECOPLASTIC CORPORATION, Gyeongju-si (KR)

(72) Inventors: Jong Heon Lee, Suwon-si (KR); Hae Ju Park, Gyeongju-si (KR); Hyo Kyoung Jeon, Daegu (KR)

(73) Assignee: ECOPLASTIC CORPORATION, Gyeongju-si (KR)

( * ) Notice: Subject to any disclaimer, the term of this patent is extended or adjusted under 35 U.S.C. 154(b) by 0 days.

(21) Appl. No.: 18/415,097

(22) Filed: Jan. 17, 2024

(65) Prior Publication Data

US 2025/0145071 A1    May 8, 2025

(30) Foreign Application Priority Data

Nov. 6, 2023  (KR) .................. 10-2023-0151958

(51) Int. Cl.
*A47C 7/62* (2006.01)
*B60N 3/10* (2006.01)

(52) U.S. Cl.
CPC .................. *B60N 3/105* (2013.01)

(58) Field of Classification Search
CPC .................................. B60N 3/105
See application file for complete search history.

(56) References Cited

U.S. PATENT DOCUMENTS

| 11,745,632 | B2 * | 9/2023 | Wu | B60N 3/102 248/311.2 |
| 2013/0038097 | A1 * | 2/2013 | Oldani | B60N 3/105 297/188.14 |
| 2022/0408925 | A1 * | 12/2022 | Rafieha | A47C 7/624 |

FOREIGN PATENT DOCUMENTS

| CN | 109017500 A | 12/2018 |
| DE | 102021133025 B3 | 6/2023 |

OTHER PUBLICATIONS

European Search Report for EP application No. 24 15 6169, dated Jul. 16, 2024, 6 pages.

* cited by examiner

*Primary Examiner* — Amy J. Sterling
(74) *Attorney, Agent, or Firm* — Tarolli, Sundheim, Covell & Tummino LLP

(57) ABSTRACT

The present disclosure relates to an electric-powered mechanical cup holder capable of elevating an accommodated container in a vertical direction. Disclosed is an electric-powered mechanical cup holder, including: a housing having a hollow hole for accommodating a container in an inside thereof; and an elevation device provided in a lower portion of the housing and configured to elevate or lower the container in a vertical direction. With this configuration, advantageous effects of improving convenience of a user can be obtained, since the cup holder is provided with an elevation device capable of elevating the accommodated container in the vertical direction, and adjusting a height of the container corresponding to a size of the container.

13 Claims, 10 Drawing Sheets

ELECTRIC-POWERED MECHANICAL CUP HOLDER

CROSS REFERENCE TO RELATED APPLICATION

The present application claims priority to Korea Patent Application No. 10-2023-0151958, filed Nov. 6, 2023, the entire contents of which is incorporated herein for all purposes by this reference.

FIELD

The present disclosure relates to an electric-powered mechanical cup holder, and more particularly, an electric-powered mechanical cup holder capable of elevating an accommodated container in a vertical direction.

BACKGROUND

In general, a cup holder which can accommodate and support a beverage can or a cup (hereinafter referred to as 'a container') is provided in a passenger's space or a cabin room of a vehicle. Such a cup holder is provided to prevent the container from being tripped on one side and from a leak of the beverage contained in the container when a driver of a passenger wants to drink the beverage during a driving of the vehicle and to facilitate a safe driving.

The cup holder is disposed at a position to which a driver or a passenger can get access easily such as a crash pad or a console box, and is provided by forming a recessed groove molded in a certain size.

The conventional cup holder has a problem in that containers of various kinds or various sizes cannot be stably supported and accommodated since its size and depth is fixed.

SUMMARY

The present disclosure is conceived to resolve the above-mentioned problem, and aims to provide an electric-powered mechanical cup holder capable of elevating the accommodated container in the vertical direction.

One embodiment is an electric-powered mechanical cup holder, including: a housing having a hollow hole for accommodating a container in an inside thereof; and an elevation device provided in a lower portion of the housing and configured to elevate or lower the container in a vertical direction.

Here, the elevation device may include: a base plate provided on an inside of the housing, configured to move in a vertical direction, and allowing the container to be seated therein; a movable part provided in the housing and configured to generate power so that the base plate moves; and an elevation link connecting between the base plate and the movable part and configured to receive power transferred by the movable part to elevate or lower the base plate.

In more detail, the elevation link may include: moving links having one ends rotatably fastened to the base plate and another ends linearly moved by the movable part; supporting links having one ends slidably fastened to the base plate and another ends rotatably fastened to the housing; and hinge portions fastened at centers of the moving links and the supporting links and supporting the moving links and the supporting links to be rotated relative to each other.

In addition, the movable part may include: a driving motor provided in the housing and configured to generate a rotational force; a lead screw configured to receive the rotational force of the driving motor so as to rotate; transferring parts threaded to the lead screw and configured to linearly move when the lead screw rotates; and transfer-fastening portions having one ends fastened to the transferring parts and another ends rotatably fastened to the moving links.

With this configuration, when the driving motor operates, the transferring parts linearly may move along the lead screw so as to linearly move the another ends of the moving links, and the moving links and the supporting links rotate about the hinge portion such that the one ends of the supporting links slide on the base plate so as to elevate or lower the base plate.

To this end, the base plate may include: moving link fastening portions to which the one ends of the moving links are rotatably fastened; and guide slits into which slide portions, to which the one ends of the supporting links are rotatably fastened, are inserted so as to guide the slide portions to slide.

In addition, the electric-powered mechanical cup holder of the present disclosure may further include: a slide supporting portion provided in the slide portion for supporting the guide slit.

The slide supporting portion may be provided as a spring so as to elastically support the guide slit.

Alternatively, the slide supporting portion may be formed to have a shape of a protrusion, a steal ball, or a shaft so as to minimize a contact area with the guide slit.

Further, the moving links and the supporting links may be symmetrically disposed with respect to the base plate or disposed diagonally at opposing corners from each other.

In this case, the transferring parts may include: a first transferring part disposed on one end of the lead screw and to which a first moving link is connected through a first transfer fastening portion; and a second transferring part disposed on another end of the lead screw and to which a second moving link is connected through a second transfer fastening portion, and the first transferring part and the second transferring part May linearly move in directions opposite to each other, respectively, when the lead screw rotates.

In addition, the electric-powered mechanical cup holder according to an embodiment of the present disclosure may further include: a control unit configured to control the movable part and adjust at least one among a speed of moving and a height of moving in a vertical direction of the base plate.

In an example, in the control unit, a dial may be provided to be rotatable, and the control unit may be configured to adjust at least one among a direction of moving, a speed of moving, and a height of moving of the base plate corresponding to a rotational angle of the dial, through a PWM control.

In another example, the control unit may be provided as a touch panel and May be configured to control at least one among a direction of moving, a speed of moving, and a height of moving of the base plate by operating a displayed command button.

In still another example, the control unit may be provided as a switch and May be configured to control at least one among a direction of moving, a speed of moving, and a height of moving of the base plate corresponding to an operation of the switch.

According to the electric-powered mechanical cup holder according to the present disclosure, since the cup holder may elevate the accommodated container in the vertical direction, and adjust a height of the container corresponding to a size of the container, an effect of improving convenience of a user can be obtained.

DETAILED DESCRIPTION

Figure 1:
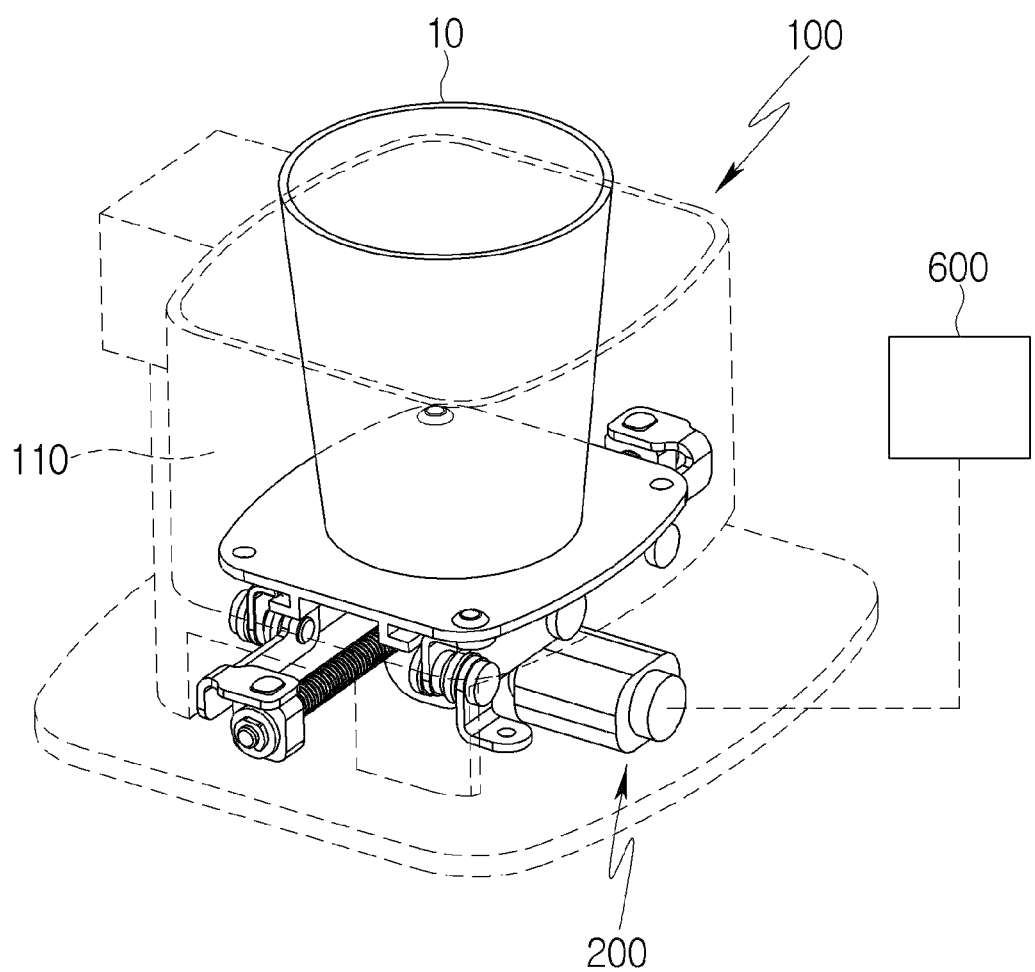
FIG. 1 is a perspective view schematically illustrating an electric-powered mechanical cup holder according to an embodiment of the present disclosure.

Hereinafter, preferred embodiments of the present invention will be described in more detail with reference to the accompanying drawings.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

The terms used in the present specification are merely used to describe specific embodiments and are not intended to limit the present invention. A singular expression includes a plural expression unless a description to the contrary is specifically pointed out in context.

Although not defined otherwise, all terms including technical terms and scientific terms used herein have the same meanings as those generally understood by a person having ordinary knowledge in the art to which the present invention pertains. Terms defined in a dictionary generally used are additionally interpreted as having a meaning consistent with the related art documents and contents currently disclosed, and unless defined otherwise, are not interpreted as having an ideal or very official meaning.

Hereinafter, exemplary embodiments of the present invention will be described in further detail with reference to the accompanying drawings.

Figure 2:
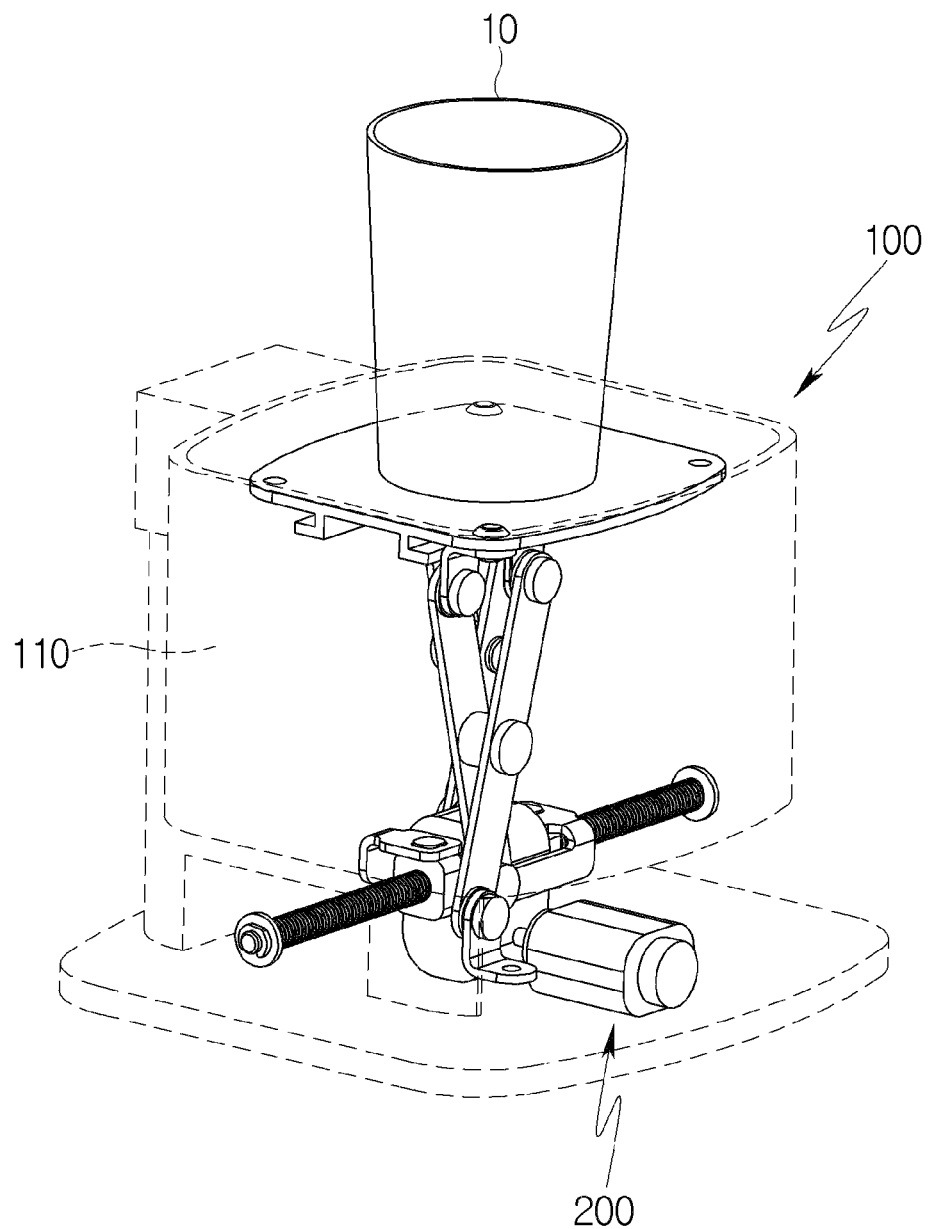
FIG. 2 is a perspective view schematically illustrating a state in which an electric-powered mechanical cup holder according to an embodiment of the present disclosure is operated to elevate a container.
Figure 3:
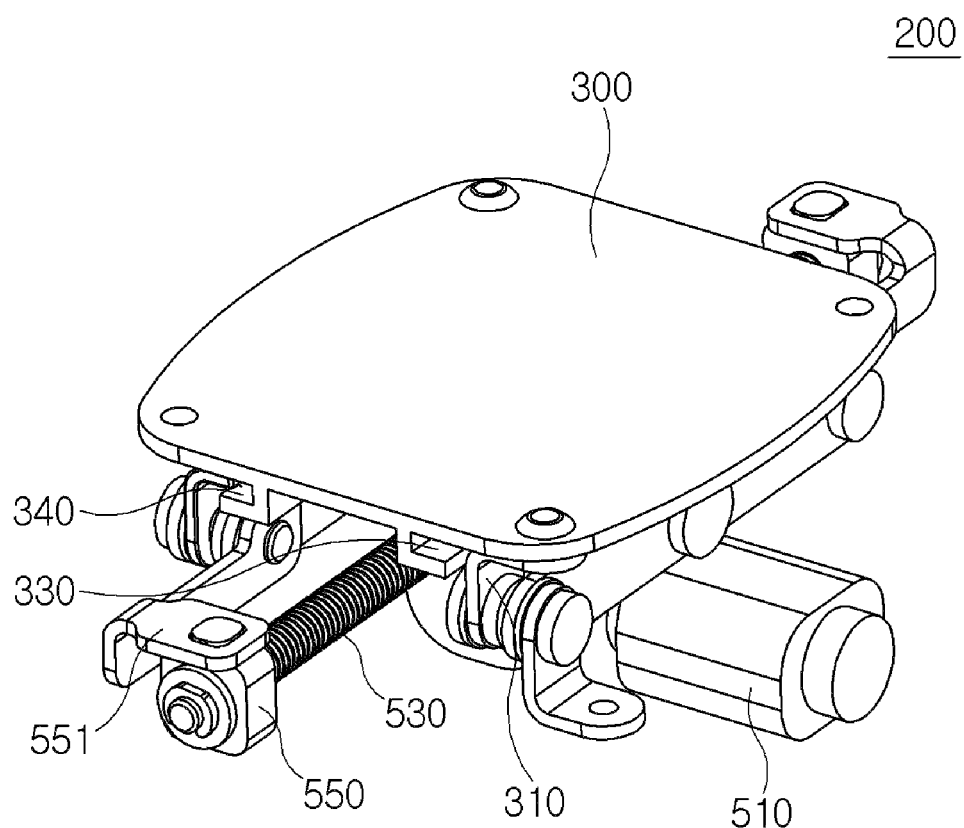
FIGS. 3 and 4 are perspective views schematically selectively illustrating an elevation device of an electric-powered mechanical cup holder according to an embodiment of the present disclosure.
Figure 4:
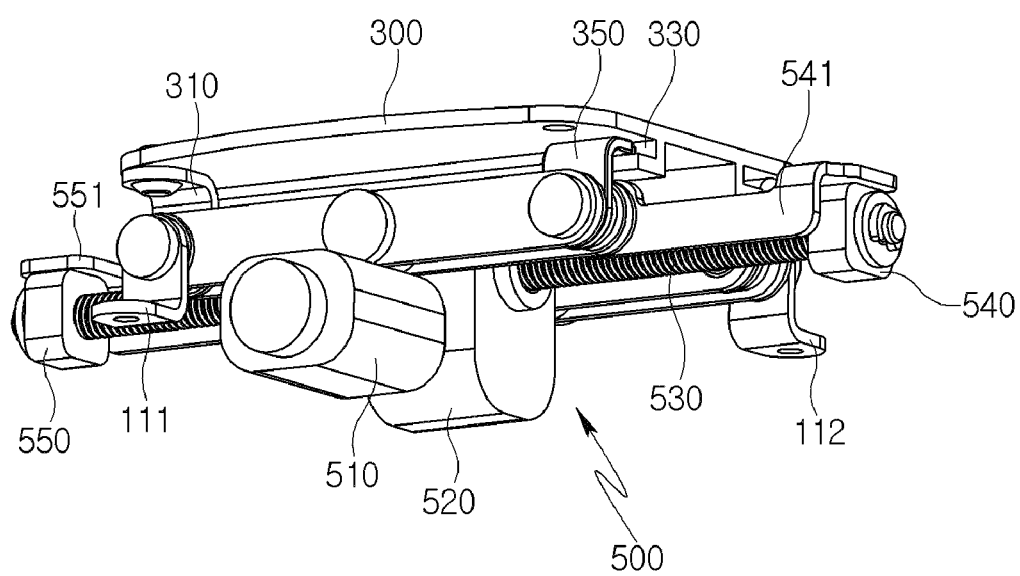
Figure 5:
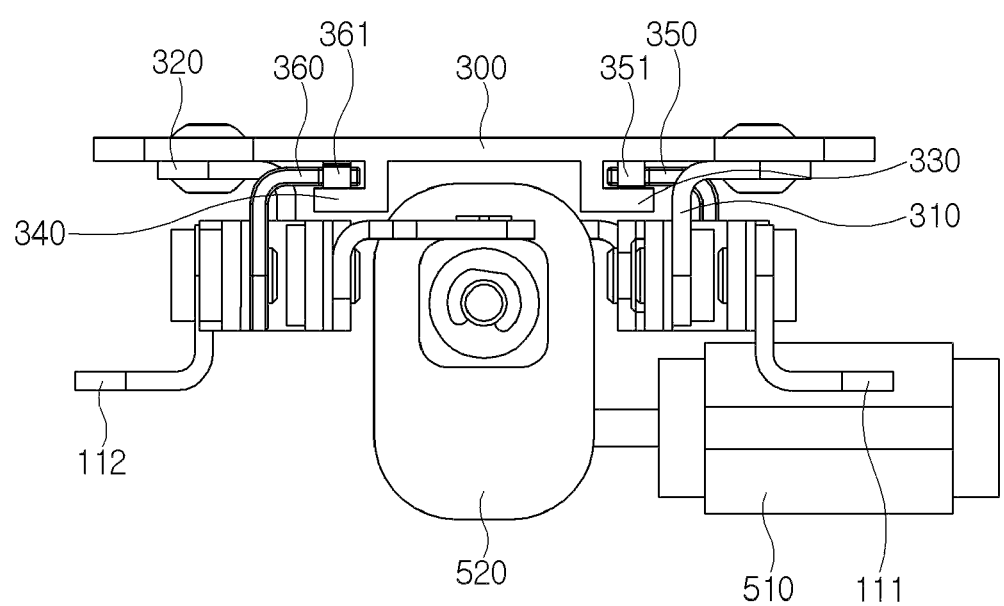
FIG. 5 is a side view schematically selectively illustrating an elevation device of an electric-powered mechanical cup holder according to an embodiment of the present disclosure.
Figure 6:
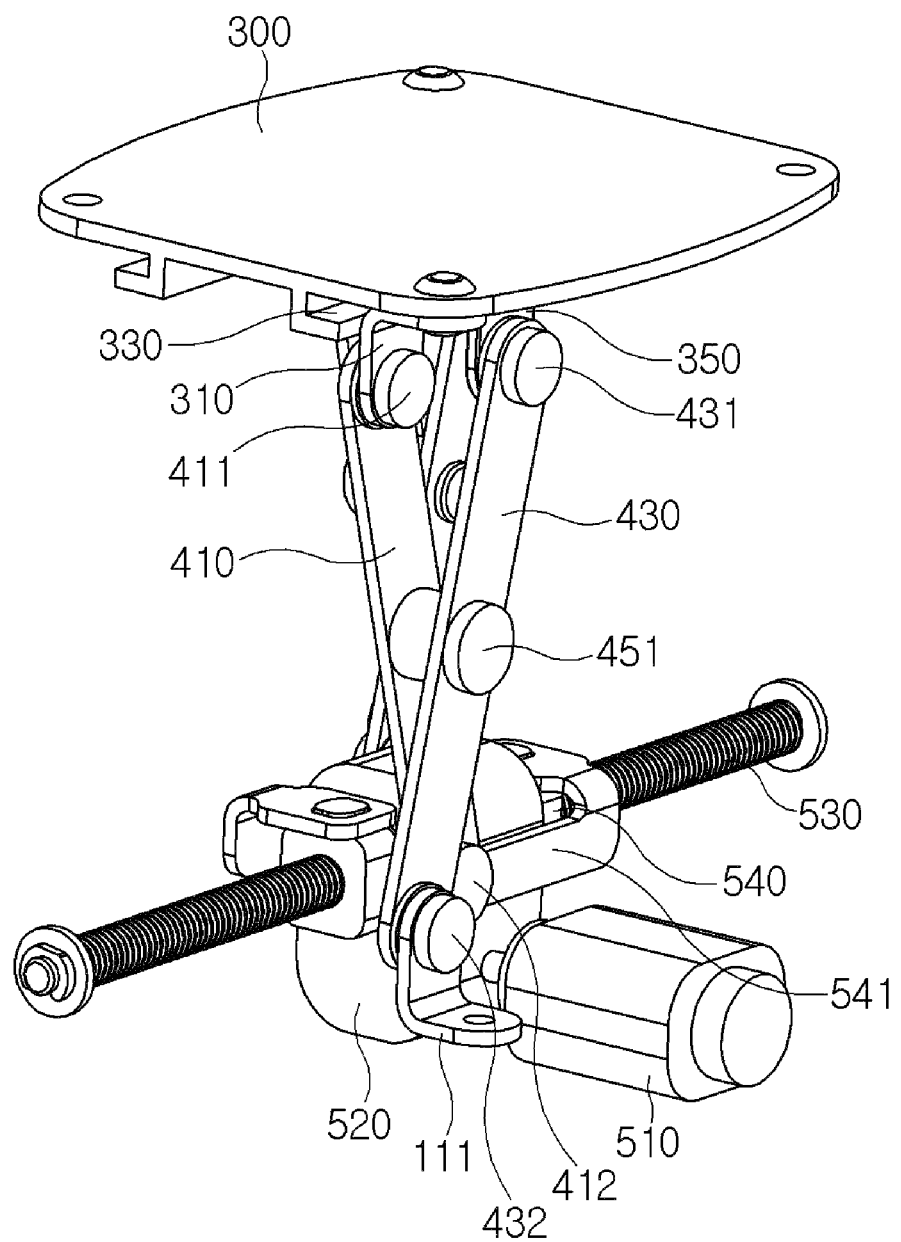
FIG. 6 is a perspective view schematically illustrating a state in which an elevation device of an electric-powered mechanical cup holder according to an embodiment of the present disclosure is operated to be elevated.
Figure 7:
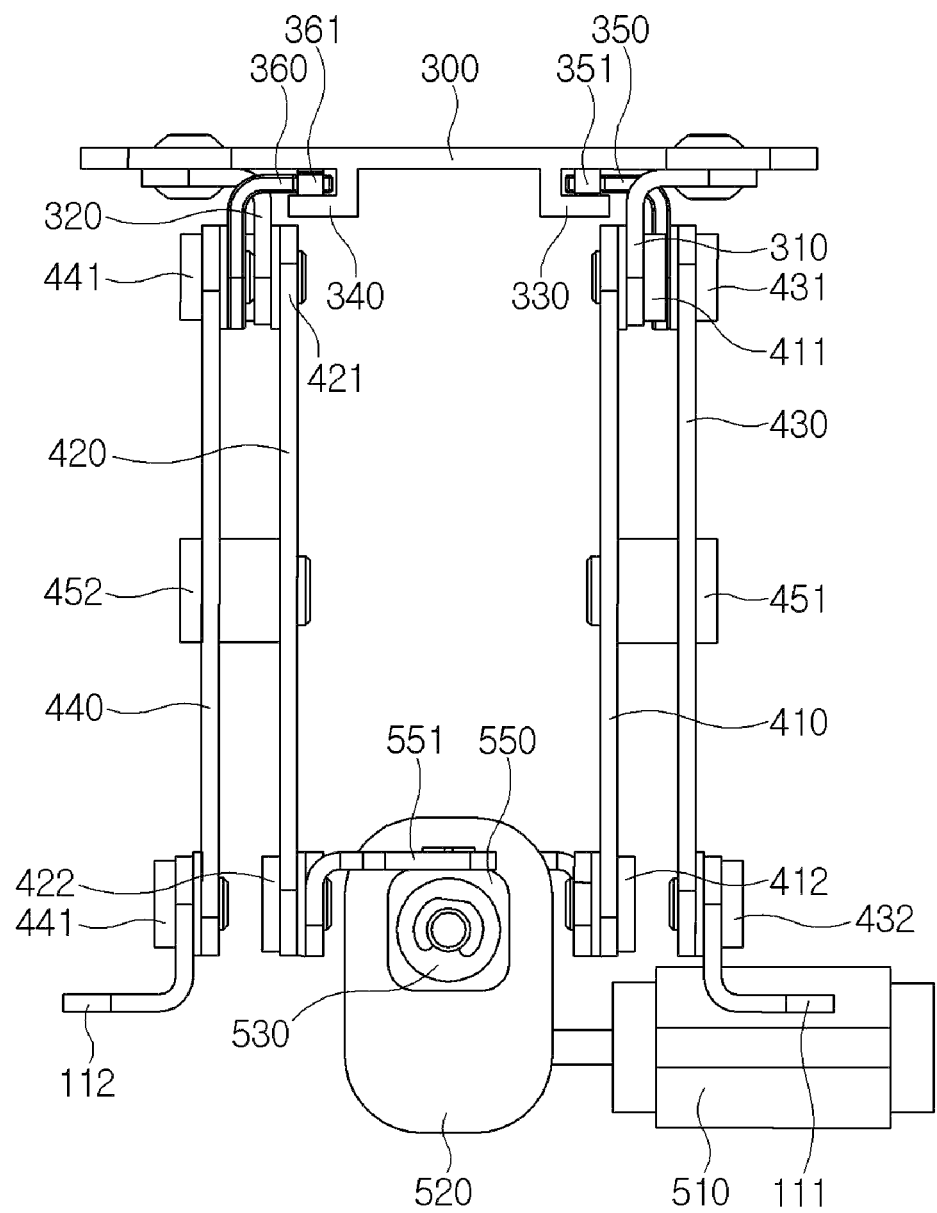
FIGS. 7 and 8 are side views schematically illustrating a state in which an elevation device of an electric-powered mechanical cup holder according to an embodiment of the present disclosure is operated to be elevated.
Figure 8:
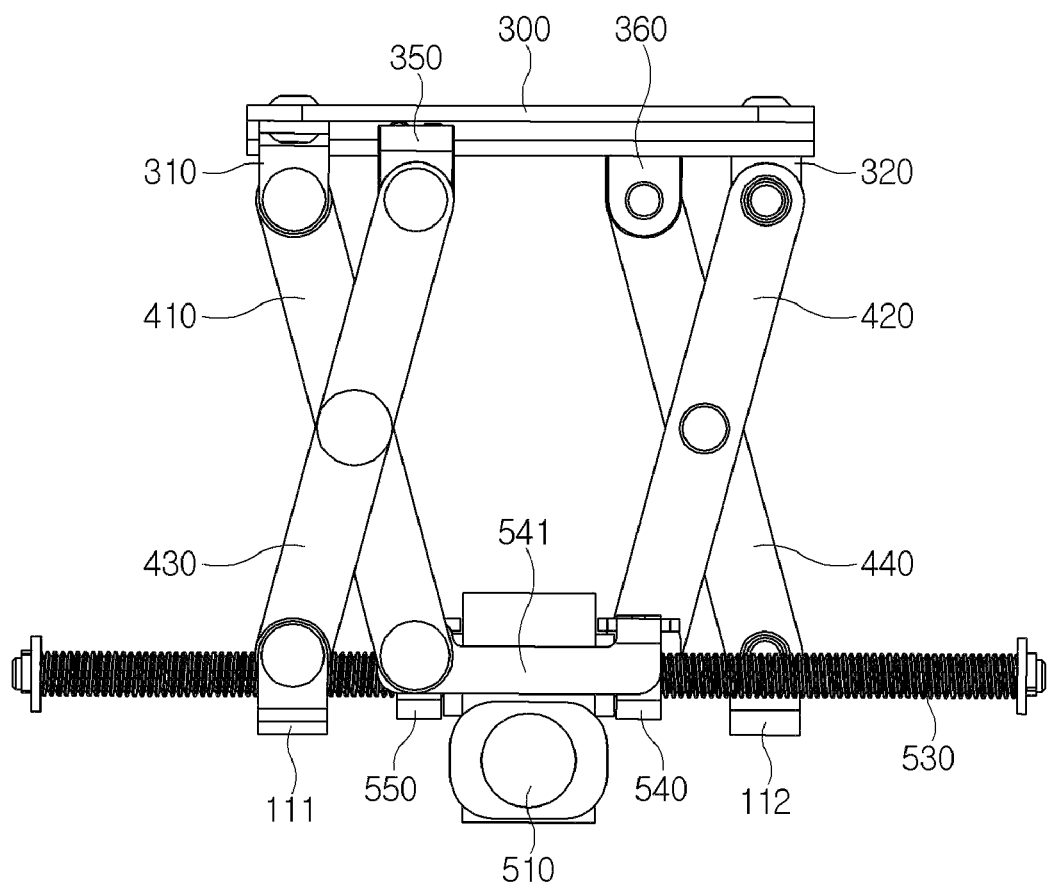
Figure 9:
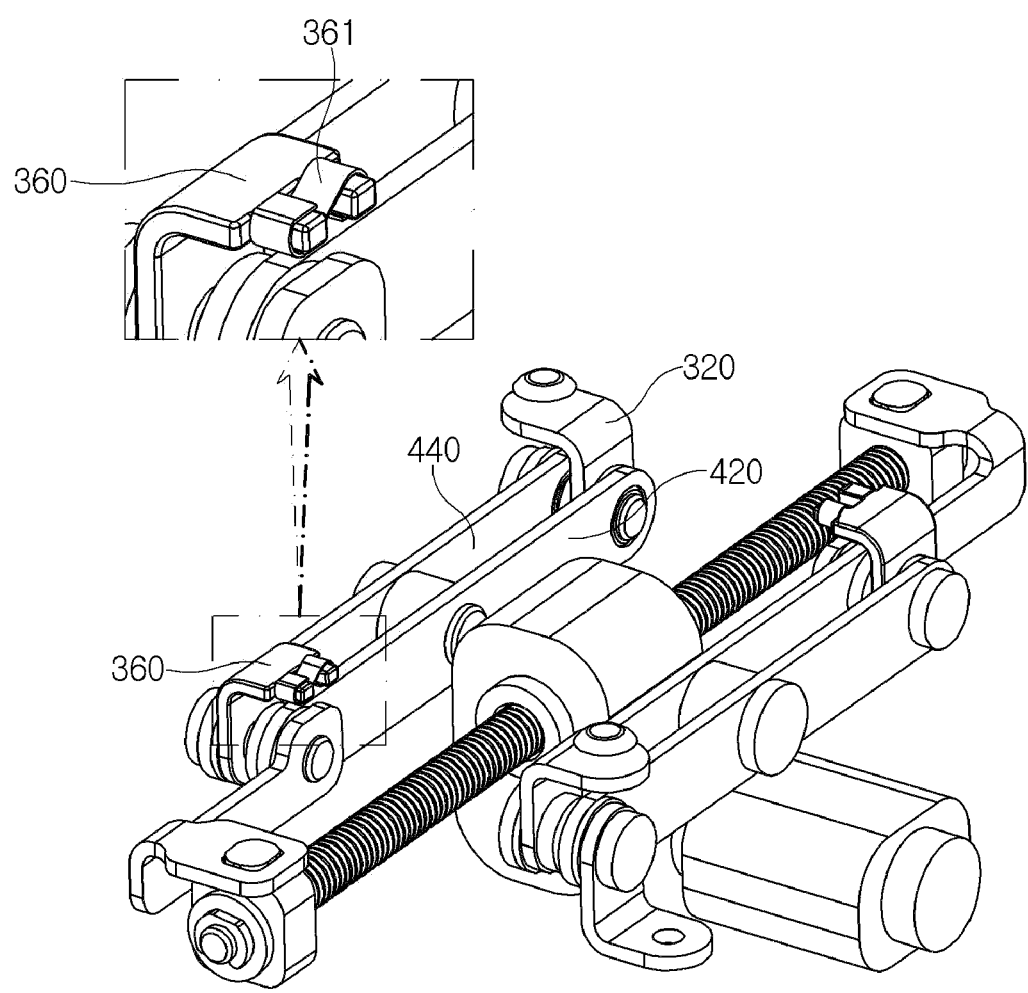
FIG. 9 is a perspective view schematically illustrating a state in which a base plate is removed from an elevation device of an electric-powered mechanical cup holder according to an embodiment of the present disclosure.
Figure 10A:
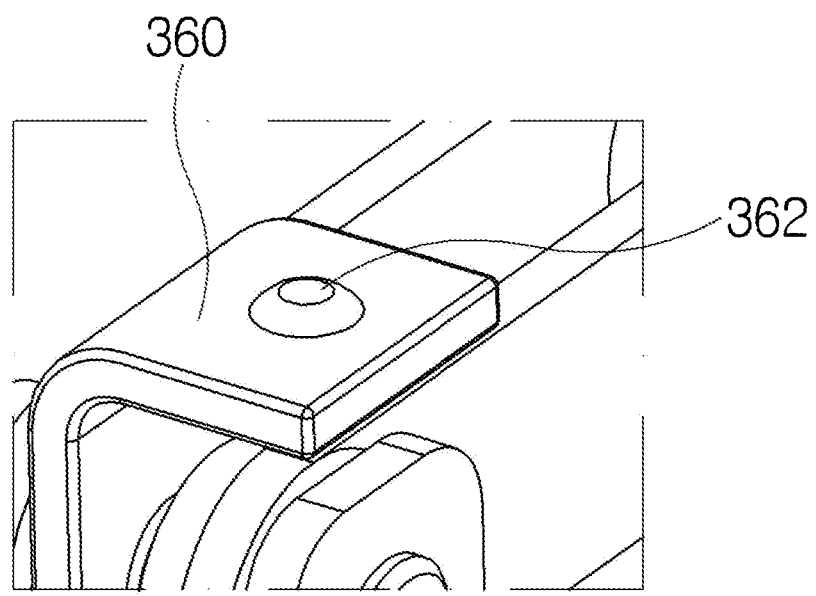
FIGS. 10a and 10b are schematically views illustrating different embodiments of a slide supporting portion of an elevation device of an electric-powered mechanical cup holder according to an embodiment of the present disclosure.
Figure 10B:
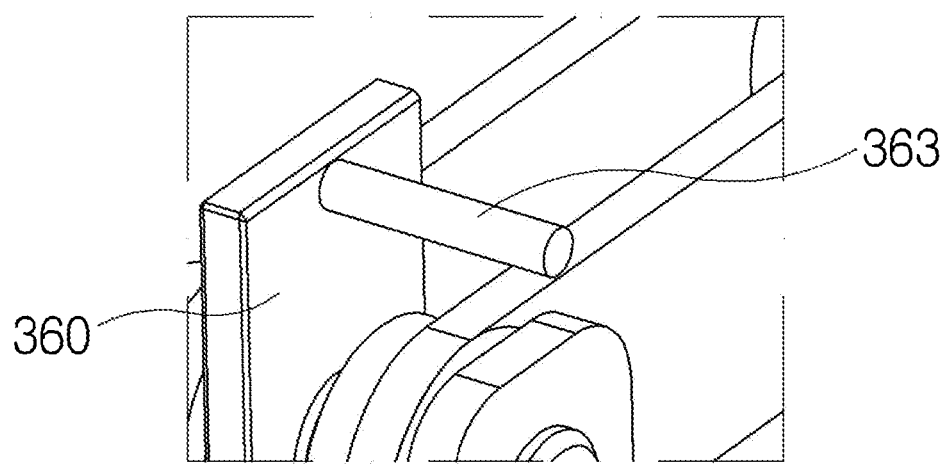

FIG. 1 is a perspective view schematically illustrating an electric-powered mechanical cup holder according to an embodiment of the present disclosure, and FIG. 2 is a perspective view schematically illustrating a state in which the electric-powered mechanical cup holder is operated to elevate a container. In addition, FIGS. 3 and 4 are perspective views schematically selectively illustrating an elevation device of the electric-powered mechanical cup holder, and FIG. 5 is a side view schematically illustrating the elevation device. Further, FIG. 6 is a perspective view schematically illustrating a state in which the elevation device is operated to be elevated, and FIGS. 7 and 8 are side views schematically illustrating a state in which the elevation device is operated to be elevated. Moreover, FIG. 9 is a perspective view schematically illustrating a state in which a base plate is removed from the elevation device, and FIGS. 10a and 10b are schematically views illustrating different embodiments of a slide supporting portion of the elevation device.

Referring to FIGS. 1 to 10, the electric-powered mechanical cup holder according to an embodiment of the present disclosure includes a housing 110 having a hollow hole for accommodating a container 10 in an inside thereof, and an elevation device 200 provided in a lower portion of the housing 110 and configured to elevate or lower the container 10 in a vertical direction.

The container 10 is inserted into the hollow hole of the housing 110 to be seated in the elevation device 200. Here, when a height of the container 10 is lower than a height of the hollow hole of the housing 110, the container 10 is accommodated in an inside of the housing 110, resulting in a problem in that a user cannot grip a side of the container 10, and thus, cannot take the container 10 out of the housing 110.

Therefore, the present disclosure provides the elevation device 200 so that when the height of the container is low, the elevation device 200 is operated in a state in which the container 10 is accommodated in the housing 110, and as the container 10 is elevated in the vertical direction, the user can take the container 10 out more easily, as seen in FIG. 2.

To this end, the elevation device 200 may include: a base plate 300 provided on an inside of the housing 110, configured to move in a vertical direction, and allowing the container 10 to be seated therein; a movable part 500 provided in the housing 110 and configured to generate power so that the base plate 300 moves; and an elevation link connecting between the base plate 300 and the movable part 500 and configured to receive power transferred by the movable part 500 to elevate or lower the base plate 300.

In more detail, the elevation link may include: moving links 410 and 420 having one ends rotatably fastened to the base plate 300 and another ends linearly moved by the movable part 500; supporting links 430 and 440 having one ends slidably fastened to the base plate 300 and another ends rotatably fastened to the housing 110; and hinge portions 451 and 452 fastened at centers of the moving links 410 and 420 and the supporting links 430 and 440 and supporting the moving links 410 and 420 and the supporting links 430 and 440 to be rotated relative to each other.

In addition, the movable part 500 may include: a driving motor 510 provided in the housing 110 and configured to generate a rotational force; a lead screw 530 configured to receive the rotational force of the driving motor 510 so as to rotate; transferring parts 540 and 550 threaded to the lead screw 530 and configured to linearly move when the lead screw 530 rotates; and transfer-fastening portions 541 and 551 having one ends fastened to the transferring parts 540 and 550 and another ends rotatably fastened to the moving links 410 and 420.

To this end, the base plate 300 may include: moving link fastening portions 310 and 320 to which the one ends of the moving links 410 and 420 are rotatably fastened; and guide slits 330 and 340 to which slide portions 350 and 360, into which the one ends of the supporting links 430 and 440 are rotatably fastened, is inserted so as to guide the slide portion to slide.

In addition, supporting link fastening portions 111 and 112 may be provided in the housing 110, and another ends of the supporting links 430 and 440 may be rotatably fastened to the supporting link fastening portions 111 and 112.

Further, the lead screw 530 may be installed to be rotatably supported through a lead screw supporting portion 520, which is disposed in the housing 110, and may be provided to be engaged with the driving motor 510 in the lead screw supporting portion 520 and to receive a rotational force from the driving motor 510 so as to rotate.

With this configuration, when the driving motor 510 operates, the transferring parts 540 and 550 may linearly move another ends of the moving links 410 and 420 while linearly moving the lead screw 530, and the transferring parts 540 and 550 and the supporting links 430 and 440 may rotate about the hinge portions 451 and 452 such that the slide portions 350 and 360, to which one ends of the supporting links are fastened, slide along the guide slits 330 and 340 formed in the base plate so as to elevate or lower the base plate 300.

The present disclosure provides the moving links 410 and 430 and the supporting links 430 and 440 as pairs, respectively, as illustrated in the drawings so as to elevate or lower the base plate 300 more stably, and disposes the moving links 410 and 430 and the supporting links 430 and 440 diagonally with respect to the base plate 300 at opposing corners from each other.

As described above, in order to operate the moving links 410 and 420 provided as a pair separately from each other, the transferring parts may include the first transferring part 540 disposed on one end of the lead screw 530, and to which the first moving link 410 is connected through the first transfer fastening portion 541, and the second transferring part 550 disposed on another end of the lead screw 530, and to which the second moving link 420 is connected through the second transfer fastening portion 551.

Here, the first transferring part 540 and the second transferring part 550 are threaded so as to linearly move in opposite directions to each other when the lead screw 530 rotates.

In more detail, the moving links are provided as the first moving link 410 and the second moving link 420.

One end 411 of the first moving link 410 is rotatably fastened to the first moving link fastening portion 310 provided in the base plate 300, and another end 412 thereof is rotatably fastened to the first moving link 541 so as to move corresponding to the linear movement of the first transferring part 540.

In addition, the second moving link 420 is disposed at a diagonal position of the base plate 300 about the lead screw 530. As such, one end 421 of the second moving link is rotatably fastened to the second moving link fastening portion 320 provided in the base plate 320, and another end 422 thereof is rotatably fastened to the second transfer fastening portion 551 so as to move corresponding to the linear movement of the second transferring part 550.

One end 431 of the first supporting link 430 is rotatably fastened to the first slide portion 350, which is inserted into the first guide slit 330 formed in the base plate 300 and slides, and another end thereof 432 is rotatably fastened to the first supporting link fastening portion 111 fastened to the housing. In addition, a center of the first supporting link 430 is relatively rotatably fastened to a center of the first moving link 410 through the first hinge portion 451.

In addition, one end 441 of the second supporting link 440 is rotatably fastened to the second slide portion 360, which is inserted into the second guide slit 340 formed in the base plate 300 and slides, and another end 442 thereof is rotatably fastened to the second supporting link fastening portion 112 fastened to the housing. In addition, a center of the second supporting link 440 is relatively rotatably fastened to a center of the second moving link 420 through the second hinge portion 452.

With this configuration, when the first transferring part 540 and the second transferring part 550 linearly move along the lead screw 530, the first moving link 410 and the first supporting link 430 relatively rotate about the first hinge portion 451, and the second moving link 420 and the second supporting link 440 relatively rotate to each other about the second hinge portion 452. In this case, in correspondence with the rotation of the first supporting link 430 and the second supporting link 440, the first slide portion 350 and the second slide portion 360 linearly move along the first guide slit 330 and the second guide slit 340 in opposite directions to each other so as to elevate and lower the base plate 300.

As such, the present disclosure provides the moving links 410 and 420 and the supporting links 430 and 440 as pairs, respectively so as to support and elevate or lower four edge regions of the base plate 300 so that the base plate 300 can stably move without shaking.

Further, referring to FIG. 9, the present disclosure may further include the slide supporting portions 351 and 361 provided in the slide portions 350 and 360 for supporting the guide slits 330 and 340. That is, the slide supporting portions are provided as a pair, a first slide supporting portion 351 and a second slide supporting portion 361, which are provided respectively in the first slide portion 350 and the second slide portion 360.

The following description will be made by example of the second slide portion 352, among the pair of slide supporting portions 351 and 361, representative of the slide portions. That is, the first slide supporting portion 351 and the second slide supporting portion 361 are configured in the same way.

For example, referring to FIG. 9, the second slide supporting portion 361 may be provided, in the second slide portion 360, as a spring capable of elastically supporting the second guide slit 340. As such, when the second slide supporting portion 361 is configured in the spring shape, the second slide supporting portion 361 may come in close contact with an inner circumferential surface of the second guide slit 340, preventing occurrence of a clearance. In addition, when the links operate, twists in the plurality of links can be prevented.

In another example, referring to FIG. 10a, the second slide supporting portion 362 may be provided, in the second slide portion 360, as a protrusion so that a contact area contacting the second guide slit 340 can be minimized. As such, when the second slide portion 362 is configured in the protrusion shape, the contact area contacting an inner circumferential surface of the second guide slit 340 can be minimized, thereby reducing friction.

In still another example, referring to FIG. 10*b*, the second slide supporting portion 363 may be provided, in the second slide portion 360, as a shaft so that a contact area contacting the second guide slit 340 can be minimized. As such, when the second slide portion 363 is configured in the shaft shape, the second slide portion 363 is in line contact with the second guide slit 340 and the contact area contacting an inner circumferential surface of the second guide slit 340 can be minimized, thereby reducing friction.

In still another example, though not illustrated, the second slide supporting portion may be provided, in the second slide portion 360, as a steel ball. That is, the slide supporting portion may be formed by forming a groove in the slide portion and inserting the steel ball into the groove. As such, when the second slide portion is configured in the steel ball shape, the second slide portion 363 is in point contact with the guide slit and the contact area contacting an inner circumferential surface of guide slit can be minimized, thereby reducing friction.

In addition, the electric-powered mechanical cup holder 100 according to the present disclosure may further include a control unit 600 configured to adjust at least one among a speed of moving and a height of moving in a vertical direction of the base plate 300. The control unit 600 may be provided at a position which allows the control unit 600 to be easily operated, such as a console of a vehicle, and the like.

In an example, the control unit 600 may be configured as a pulse width modulation (PWM) control unit and a dial, through which control signals are input into the PWM control unit. Here, the PWM control unit may be configured to transfer command signals for controlling the driving motor 510, by being connected to the movable part 500 wirelessly or through wires.

With this configuration, it is possible to make the base plate 300 be elevated or lowered corresponding to a direction of a rotation, when the user rotates the dial. In addition, the control unit 600 may be configured in a manner that at least one among a speed of moving, and a height of moving of the base plate 300 can be adjusted through the PWM control, in correspondence with a rotational angle of the dial, when the dial is rotated and the rotational angle of the dial is adjusted.

That is, the user may set up a moving speed of the base plate 300 by adjusting a motor duty of the motor to adjust a rotational speed of the motor according to a rotation position of the dial. Alternatively, the user may set up a height of moving of the base plate 300 by adjusting the number of rotations of the motor according to a rotation position of the dial. Though not illustrated, a command input for setting the speed of moving or the height of moving of the base plate 300 may be changed by touching or pressing the dial.

In another example, the control unit 600 may be configured as a touch panel. Here, the control unit 600 may be configured in a manner that in the touch panel, command buttons are displayed, and one among a direction of moving, a speed of moving, and a height of moving of the base plate 300 may be controlled when the user operates displayed command buttons. Here, the touch panel may be connected to the movable part 500 wirelessly or through wires and may be configured to transfer command signals for controlling the driving motor 510.

The command buttons for adjusting the speed of moving and the height of moving of the base plate 300, respectively, may be displayed in the touch panel, and the user may touch the command buttons to adjust. In addition, the control unit 600 may be configured in a manner that Arabic numerals indicating the speed of moving and the height of moving are displayed at a central portion of the button. Of course, the manner of the touch panel display is one example, and the command input by the user may be performed in various manners.

In still another example, the control unit 600 may be configured as a switch. That is, the control unit 600 may be configured to control at least one among the direction of moving, the speed of moving, and the height of moving of the base plate 300 corresponding to an operation of the switch.

In an example, it may be configured in a manner that the base plate 300 is elevated when the user presses a front of the switch, and the base plate 300 is lowered when the user presses a rear of the switch. Here, it may be configured in a manner that the height of moving of the base plate is controlled in correspondence with a time during which the switch is pressed, and the speed of moving of the base plate is controlled in correspondence with a pressure at which the switch is pressed.

As described above, the electric-powered mechanical cup holder 100 according to the present disclosure includes the control unit 600 capable of adjusting the speed of moving and the height of moving of the base plate 300, in which the container 10 is seated, thereby improving the convenience of the user.

According to the electric-powered mechanical cup holder according to the present disclosure, since the cup holder may elevate the accommodated container in the vertical direction, and adjust a height of the container corresponding to a size of the container, an effect of improving convenience of a user can be obtained.

The present disclosure has been described in detail with reference to the exemplary embodiments, but the exemplary embodiments are illustrative and the present disclosure is not limited thereto. It is apparent that those skilled in the art may modify or improve the exemplary embodiments within the technical spirit of the present disclosure.

All of the simple modifications or changes of the present disclosure belong to the scope of the present disclosure, and the specific scope of the present disclosure may be apparent by the accompanying claim

REFERENCE NUMERALS

100: electric-powered mechanical cup holder
110: housing
111: first support link fastening portion
112: second support link fastening portion
200: elevation device
300: base plate
310: first moving link fastening portion
320: second moving link fastening portion
330: first guide slit
340: second guide slit
350: first slide portion
351: first slide supporting portion
360: second slide portion
361: second slide supporting portion
410: first moving link
420: second moving link
430: first supporting link
440: second supporting link
451: first hinge portion
452: second hinge portion 500: movable part
510: driving motor
520: lead screw supporting portion
530: lead screw
540: first transferring part
541: first transfer fastening portion
550: second transferring part
551: second transfer fastening portion
600: control unit

What is claimed is:

1. An electric-powered mechanical cup holder, comprising:
   a housing having a hollow hole for accommodating a container in an inside thereof; and
   an elevation device provided in a lower portion of the housing and configured to elevate or lower the container in a vertical direction, the elevation device comprising:
      a base plate provided on an inside of the housing configured to move in a vertical direction, and allowing the container to be seated therein;
      a movable part provided in the housing and configured to generate power so that the base plate moves; and
      an elevation link connecting between the base plate and the movable part and configured to receive power transferred by the movable part to elevate or lower the base plate, the elevation link comprising:
         moving links having one ends rotatably fastened to the base plate and another ends linearly moved by the movable part;
         supporting links having one ends slidably fastened to the base plate and another ends rotatably fastened to the housing; and
         hinge portions fastened at centers of the moving links and the supporting links and supporting the moving links and the supporting links to be rotated relative to each other.

2. The electric-powered mechanical cup holder of claim 1, wherein the movable part comprises:
   a driving motor provided in the housing and configured to generate a rotational force;
   a lead screw configured to receive the rotational force of the driving motor so as to rotate;
   transferring parts threaded to the lead screw and configured to linearly move when the lead screw rotates; and
   transfer-fastening portions having one ends fastened to the transferring parts and another ends rotatably fastened to the moving links.

3. The electric-powered mechanical cup holder of claim 2, wherein when the driving motor operates, the transferring parts linearly move along the lead screw so as to linearly move the another ends of the moving links, and the moving links and the supporting links rotate about the hinge portion such that the one ends of the supporting links slide on the base plate so as to elevate or lower the base plate.

4. The electric-powered mechanical cup holder of claim 1, wherein the base plate comprises:
   moving link fastening portions to which the one ends of the moving links are rotatably fastened; and
   guide slits into which slide portions, to which the one ends of the supporting links are rotatably fastened, are inserted so as to guide the slide portions to slide.

5. The electric-powered mechanical cup holder of claim 4, further comprising: a slide supporting portion provided in the slide portion for supporting the guide slit.

6. The electric-powered mechanical cup holder of claim 5, wherein the slide supporting portion is provided as a spring so as to elastically support the guide slit.

7. The electric-powered mechanical cup holder of claim 5, wherein the slide supporting portion is formed to have a shape of a protrusion, a steal ball, or a shaft so as to minimize a contact area with the guide slit.

8. The electric-powered mechanical cup holder of claim 2, wherein the moving links and the supporting links are symmetrically disposed with respect to the base plate or disposed diagonally at opposing corners from each other.

9. The electric-powered mechanical cup holder of claim 8, wherein the transferring parts comprises:
   a first transferring part disposed on one end of the lead screw and to which a first moving link is connected through a first transfer fastening portion; and
   a second transferring part disposed on another end of the lead screw and to which a second moving link is connected through a second transfer fastening portion, and
   wherein the first transferring part and the second transferring part linearly move in directions opposite to each other, respectively, when the lead screw rotates.

10. The electric-powered mechanical cup holder of claim 1, further comprising: a control unit configured to control the movable part and adjust at least one among a speed of moving and a height of moving in a vertical direction of the base plate.

11. The electric-powered mechanical cup holder of claim 10, wherein in the control unit, a dial is provided to be rotatable, and the control unit is configured to adjust at least one among a direction of moving, a speed of moving, and a height of moving of the base plate corresponding to a rotational angle of the dial, through a pulse width modulation (PWM) control.

12. The electric-powered mechanical cup holder of claim 10, wherein the control unit is provided as a touch panel and is configured to control at least one among a direction of moving, a speed of moving, and a height of moving of the base plate by operating a displayed command button.

13. The electric-powered mechanical cup holder of claim 10, wherein the control unit is provided as a switch and is configured to control at least one among a direction of moving, a speed of moving, and a height of moving of the base plate corresponding to an operation of the switch.

* * * * *